United States Patent [19]

Sensui

[11] Patent Number: 5,397,887
[45] Date of Patent: Mar. 14, 1995

[54] FOCUS DETECTION APPARATUS HAVING MULTIPLE DETECTING ZONES

[75] Inventor: Takayuki Sensui, Tokyo, Japan

[73] Assignee: Asahi Kogaku Kogyo Kabushiki Kaisha, Tokyo, Japan

[21] Appl. No.: 187,066

[22] Filed: Jan. 27, 1994

Related U.S. Application Data

[63] Continuation of Ser. No. 85,137, Jul. 2, 1993, Pat. No. 5,321,248, which is a continuation of Ser. No. 873,100, Apr. 24, 1992, abandoned.

[30] Foreign Application Priority Data

Apr. 25, 1991 [JP] Japan ................... 3-191344

[51] Int. Cl.$^6$ ............................... G01J 1/20
[52] U.S. Cl. ........................ 250/201.8; 354/407
[58] Field of Search ............. 250/201.2, 201.7, 201.8, 250/204, 208.1; 354/402, 406, 407, 408, 409

[56] References Cited

U.S. PATENT DOCUMENTS

| Re. 31,370 | 9/1983 | Mashimo et al. | 354/230 |
|---|---|---|---|
| Re. 32,652 | 4/1988 | Nakamura et al. | 250/201.8 |
| 2,922,351 | 4/1956 | Hering | 354/402 |

(List continued on next page.)

FOREIGN PATENT DOCUMENTS

| 0055338 | 7/1982 | European Pat. Off. |
|---|---|---|
| 0402828 | 12/1990 | European Pat. Off. |
| 2382056 | 9/1978 | France |
| 1211815 | 3/1966 | Germany |
| 3505864 | 8/1985 | Germany |
| 3803305 | 8/1988 | Germany |
| 59-126517 | 7/1984 | Japan |
| 60-32012 | 2/1985 | Japan |
| 60-41013 | 3/1985 | Japan |
| 62-189415 | 8/1985 | Japan |
| 61-113017 | 5/1986 | Japan |
| 62-47612 | 3/1987 | Japan |
| 1155308 | 6/1989 | Japan |
| 2-58012 | 2/1990 | Japan |
| 2120712 | 5/1990 | Japan |
| 2130041 | 5/1984 | United Kingdom |
| 2183419 | 6/1987 | United Kingdom |
| 2213602 | 8/1989 | United Kingdom |
| 87-1571 | 3/1987 | WIPO |

OTHER PUBLICATIONS

Mitsuo Ikeda, Psychological Physics of Vision (1975), with English translation of portions thereof.

"Fixation Point Measurement by the Oculometer Technique," *Optical Engineering*, Jul./Aug. 1974, pp. 339–342.

G. Schroder, "Techische Optik Kurz und bunding," *Vogel-Verlag* 1974, p. 41, and English translation.

English Language Abstracts of Japanese Publication Nos. 60-41013, 62-189415, and 62-47612.

English Language Abstract of Japanese Publication No. 60-32012.

Patent Abstracts of Japan, vol. 14, No. 341, Jul. 24, 1990.

Patent Abstracts of Japan, vol. 8, No. 219, (p. 306), Oct. 5, 1984.

English Language Abstract of Japanese of Publication No. 61-113017.

Patent Abstracts of Japan, vol. 10, No. 294 (P-504), Oct. 7, 1986.

*Primary Examiner*—David C. Nelms
*Assistant Examiner*—John R. Lee
*Attorney, Agent, or Firm*—Sandler Greenblum & Bernstein

[57] ABSTRACT

A focus detecting apparatus, includes multiple detecting zones situated in a focal plane, an orientation changing mechanism which changes the orientations of images formed in these zones, an image separating device which separate these images into image pairs, and multiple sensors. The multiple sensors have a different positional relationship than that of the multiple detecting zones which detect the image pairs.

12 Claims, 21 Drawing Sheets

U.S. PATENT DOCUMENTS

| | | | |
|---|---|---|---|
| 3,691,922 | 9/1972 | Konig et al. | 354/404 |
| 4,047,187 | 9/1977 | Mashimo et al. | 354/407 |
| 4,083,056 | 4/1978 | Nakamura et al. | 354/407 |
| 4,171,155 | 10/1979 | Jyoujiki et al. | 354/407 |
| 4,183,642 | 1/1980 | Fukuoka | 354/402 |
| 4,223,988 | 9/1980 | Jyoujiki et al. | 354/407 |
| 4,307,947 | 12/1981 | Jyoujiki | 354/406 |
| 4,333,716 | 6/1982 | Sakane et al. | 354/402 |
| 4,459,004 | 7/1984 | Morizumi | . |
| 4,548,495 | 10/1985 | Suzuki | 356/123 |
| 4,560,863 | 12/1985 | Matsumura et al. | 250/201.2 |
| 4,563,576 | 1/1986 | Matsumura et al. | 250/204 |
| 4,574,314 | 3/1986 | Weinblatt | 358/407 |
| 4,636,624 | 1/1987 | Ishida et al. | 250/201.8 |
| 4,716,431 | 12/1997 | Shindo | 354/407 |
| 4,768,052 | 8/1988 | Hamada et al. | 354/402 |
| 4,786,934 | 11/1988 | Kunze et al. | 354/409 |
| 4,843,415 | 6/1989 | Matsui et al. | 354/403 |
| 4,857,720 | 8/1989 | Karasaki et al. | 250/201.2 |
| 4,859,842 | 8/1989 | Suda et al. | 250/201.8 |
| 4,908,504 | 3/1990 | Karasaki et al. | 250/201.2 |
| 4,949,116 | 8/1990 | Karasaki et al. | 354/408 |
| 4,950,879 | 8/1990 | Ishida et al. | 250/201.8 |
| 4,952,966 | 8/1990 | Ishida et al. | 354/406 |
| 4,954,701 | 9/1991 | Suzuki et al. | 250/201.8 |
| 4,978,988 | 12/1991 | Karasaki et al. | 354/406 |
| 4,992,818 | 2/1991 | Karasaki et al. | 354/407 |
| 5,017,005 | 5/1991 | Shindo | 356/125 |
| 5,121,152 | 6/1992 | Wagner | 354/402 |
| 5,137,350 | 8/1992 | Misawa et al. | 356/1 |
| 5,138,359 | 8/1992 | Nagano et al. | 354/406 |
| 5,206,498 | 4/1993 | Sensui | 250/208.1 |
| 5,291,234 | 3/1994 | Shindo et al. | . |
| 5,321,248 | 6/1994 | Sensui | 250/201.8 |

$\Delta Y \neq \Delta H$

FOCUS DETECTION APPARATUS HAVING MULTIPLE DETECTING ZONES

This application is a continuation of application number 08/085,137, filed Jul. 2, 1993, now U.S. Pat. No. 5,321,248, which is a continuation of application No. 07/873,100, filed Apr. 24, 1992, now abandoned.

BACKGROUND OF THE INVENTION

1. Field of the Invention

The present invention relates to a focus detection apparatus which detects the focusing status of a photographic lens with respect to an object within multiple zones of a picture to be photographed.

2. Description of the Prior Art

In the prior art, an apparatus is known wherein a zone of an image in the center of a picture to be photographed is separated into an image pair onto line sensors, and the focusing status of the lens is detected according to an output difference of these sensors, as described in Japanese Laid-Open Publication No. SHO 59-128517.

This conventional apparatus however can detect only the focusing status of a lens with respect to an object in the center of the picture, and a focus lock method has to be used for objects on a periphery.

Japanese Laid-Open Publications Nos. HEI 1-15808 and HEI 2-58012 disclose apparatuses wherein multiple focal point detecting zones are provided in a focal plane, and multiple images in these zones are separated on multiple line sensors.

It is desirable, to reduce the effect of vignetting of the photographic lens, that the detection zones on the periphery of the focal plane are arranged in the sagittal direction perpendicular to a radial direction of the photographic lens. On the other hand, if the sensors in the reimaging plane can be arranged in a straight line, it is then possible to employ only one sensor divided into multiple parts. There are therefore different requirements regarding the arrangement of detection zones and sensors. In the prior art, however, these positional relationships were set and could not be changed.

SUMMARY OF THE INVENTION

In view of the aforesaid problems in the prior art, it is an object of the invention to provide a focus detecting apparatus wherein line sensors on the sensor unit can be freely arranged independently of the arrangement of detecting zones in a focal plane.

To achieve the aforesaid objects, the focus detecting apparatus of this invention is therefore characterized in that it comprises multiple detecting zones situated in a focal plane, orientation changing means which change the orientation of images formed in these zones, image separating means which separate these images into image pairs, and multiple sensors having a different positional relationship to that of the multiple zones which detect these image pairs.

DETAILED DESCRIPTION OF THE EMBODIMENTS

The embodiments of the present invention will now be described with reference to the drawings. The present disclosure relates to subject matter contained in Japanese Patent Application No. Hei 3-191344 (filed on Apr. 25, 1991), which is expressly incorporated herein by reference in its entirety.

EMBODIMENT 1

FIGS. 1 to 4 show a first embodiment of the focus detecting apparatus according to this invention.

Figure 1:
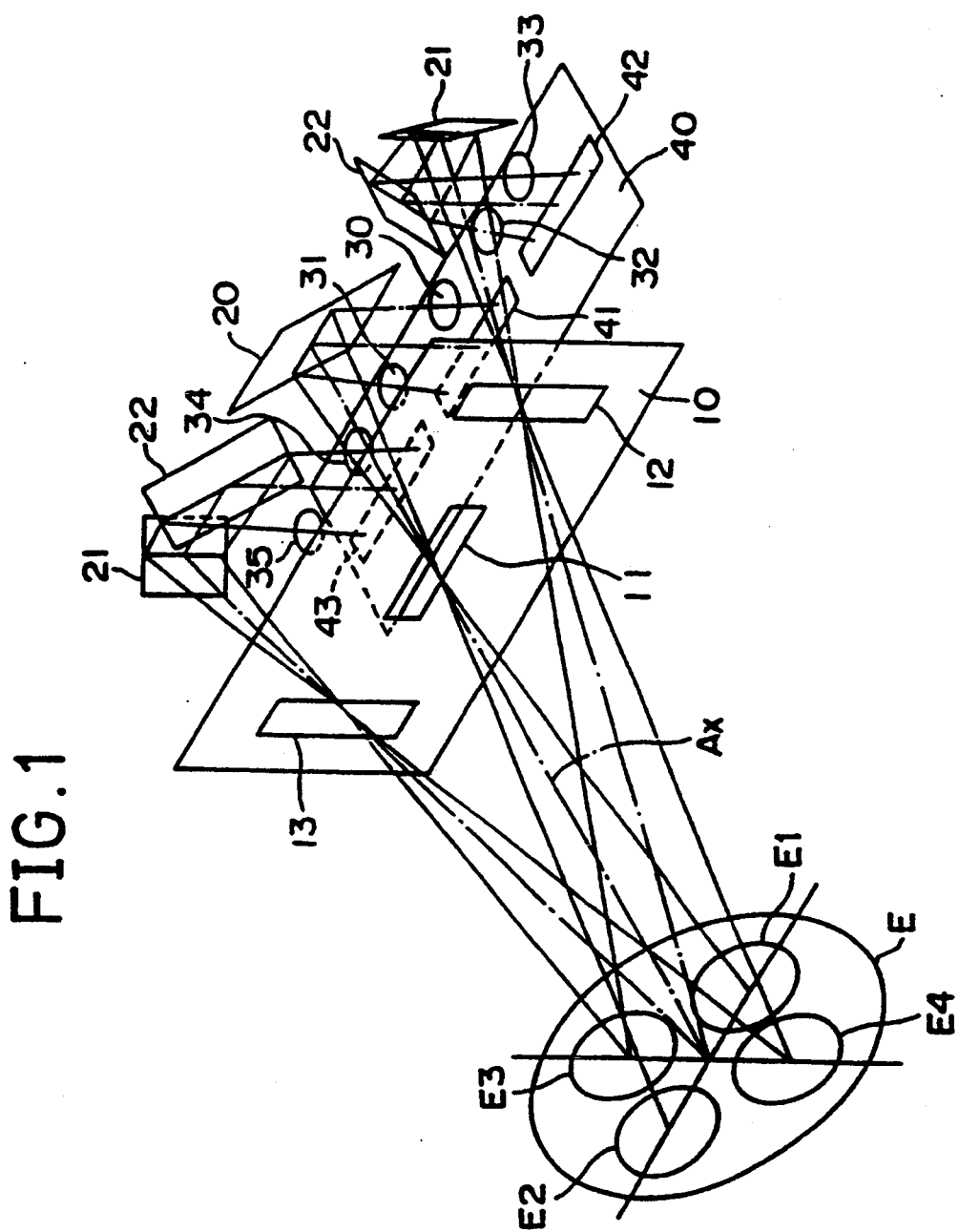
FIG. 1 is a perspective view of an optical system of a focus detecting apparatus according to a first embodiment of this invention.
Figure 2:
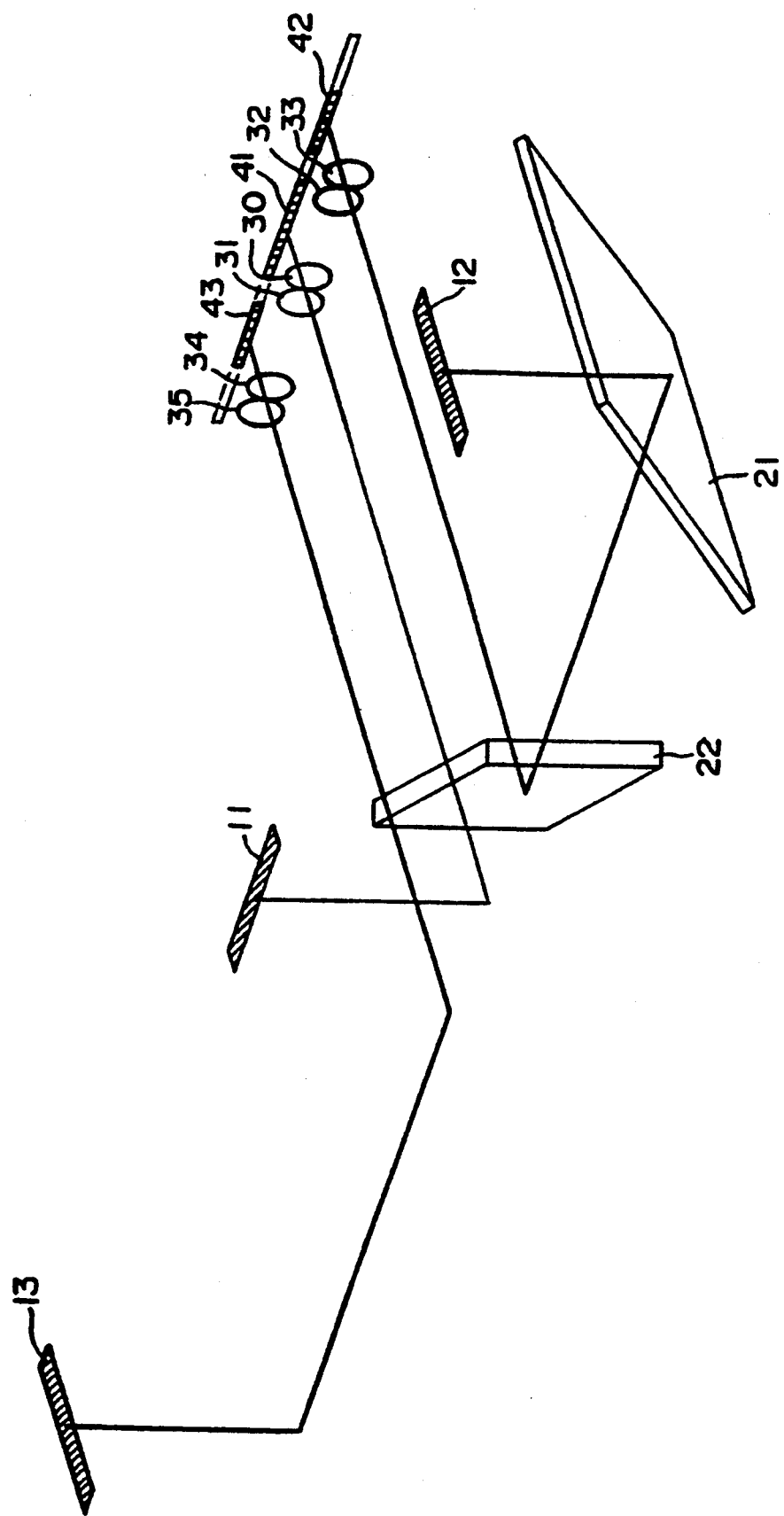
FIG. 2 is a perspective view showing essential parts of the apparatus shown in FIG. 1.

As shown in FIG. 1 and FIG. 2, a visual field mask 10 for extracting parts of an object to be photographed is disposed in the vicinity of a focal plane in which an image of an object is formed by a photographic lens. On this mask 10, three focus detecting zone openings 11, 12, 13 are formed which determine the visual field of the focus detecting system.

The focal plane is disposed in an optically conjugate position to a film if the focus detecting apparatus is used in a photographic camera, and to an image sensor if it is used in an electronic camera. This plane is also in an optically conjugate relation to a focusing screen in the optical finder system of the camera, not shown.

The focus detecting zones comprise a central detecting zone 11 on an optic axis of the photographic lens, and two peripheral detecting zones 12, 13 oriented parallel to the sagittal direction of the lens and perpendicular to the longitudinal direction of the central zone 11.

A light beam which has passed through two regions E1, E2 arranged horizontally on pupil E of the photographic lens and through the central detecting zone 11 is deflected through 90° by a first mirror 20, and separated by a pair of separating lenses 30, 31 so as to form an image pair on a line sensor 41 of a sensor unit 40 disposed in a reimaging plane. The pupils of these separator lenses are in optically conjugate positions to the pupil E of the photographic lens.

Light beams which have passed through two regions E3, E4 arranged vertically on pupil E and through the peripheral detecting zones 12, 18 are each deflected through 90° in turn by second and third mirrors 21, 22 so as to change the orientation of the images, and the resulting images are each separated by pairs of separating lenses 32, 33, and 34, 35 so as to form image pairs on line sensors 42, 43.

Since the optical path length between the center zone 11 and the sensor 41 is different from that between the peripheral zones 12, 13 and the sensors 42, 43, separating lenses of different focal lengths are used.

Focusing areas in the image finder corresponding to the focus detecting zones in the focal plane are provided for the convenience of the user to observe the focus detecting zones. A focus detecting circuit detects the focusing status of the photographic lens using the outputs of the line sensors corresponding to the object selected by the user or by a camera circuit.

Figure 3:
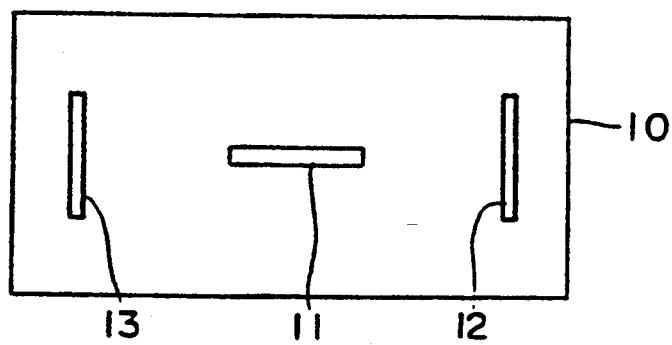
FIG. 3 is a plan view showing an arrangement of focus detecting zones in a focal plane according to the first embodiment of this invention.
Figure 4:
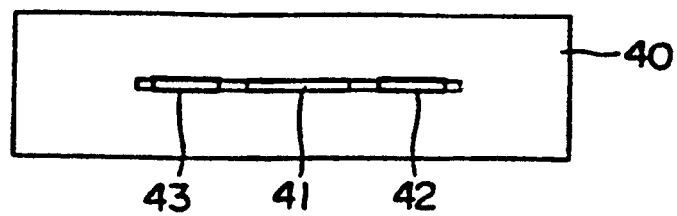
FIG. 4 is a plan view showing the arrangement of line sensors in a reimaging plane according to the first embodiment of this invention.

As the optical path is deflected by the mirrors, the central detecting zone 11 and the peripheral detecting zones 12, 13 may be arranged perpendicular to each other on the visual field mask 10 disposed in the focal plane, as shown in FIG. 3, while the line sensors 41, 42, 43 are simultaneously arranged in a straight line on the sensor unit 40, as shown in FIG. 4.

The exit pupil of the photographic lens is spherical. Orientation of the peripheral detecting zones perpendicular to the longitudinal direction of the central detecting zone therefore makes it less likely that vignetting of the lens will give rise to eclipsing. If the peripheral zones were oriented parallel to the longitudinal direction of the central zone, there is a strong possibility that the edges of the image would be eclipsed by vignetting, leading to a reduction of the amount of light from the image and making accurate focus detection difficult.

Further, by arranging the line sensors in a straight line, the focusing status of three detecting zones can be detected by a single sensor. In this case, the sensor is divided into three regions corresponding to the detecting zones and each of these regions is divided into two parts.

Figure 5:
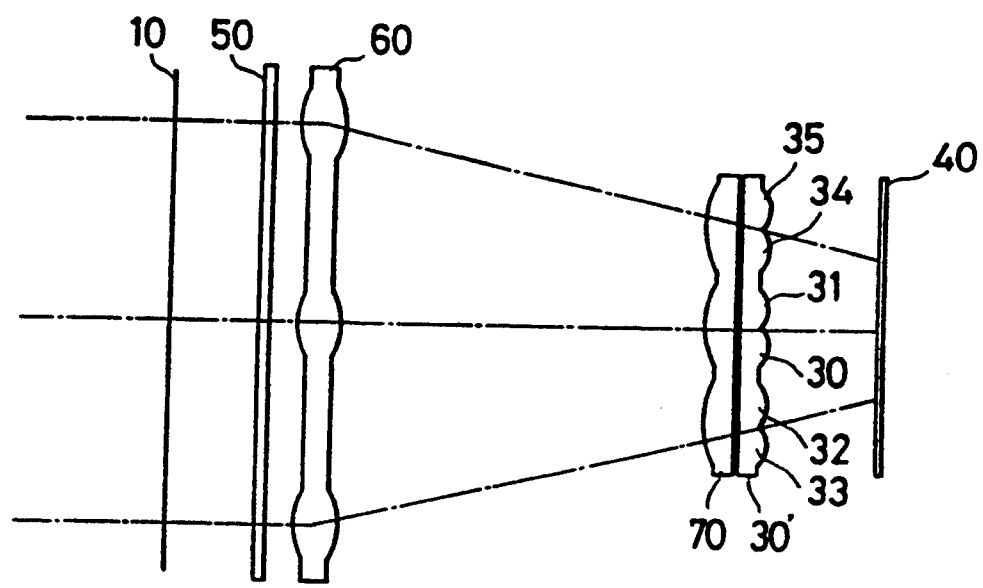
FIG. 5 is a schematic drawing showing a detailed construction of the focus detecting apparatus according to the first embodiment of this invention.

FIG. 5 shows the detailed construction of the aforesaid embodiment. All components from the visual field mask 10 to the line sensors 41, 42, 43 are assembled as a single module housed in the camera. Behind the mask 10 are arranged a cover glass 50, a condensing lens 60 which acts as a relay lens, an auxiliary lens 70, a separating lens group 30' and a sensor unit 40.

Figure 6:
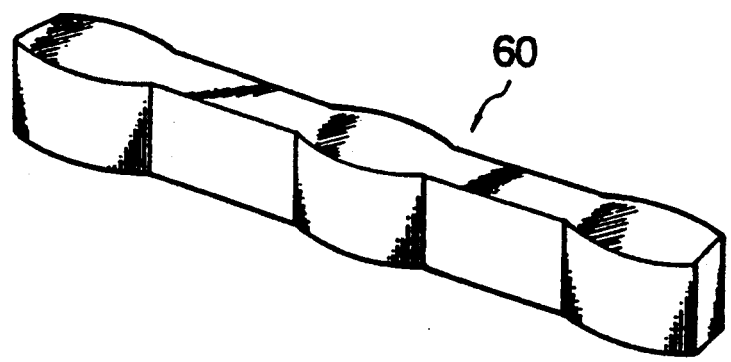
FIG. 6 is a perspective drawing of a condensing lens shown in FIG. 5.
Figure 7:
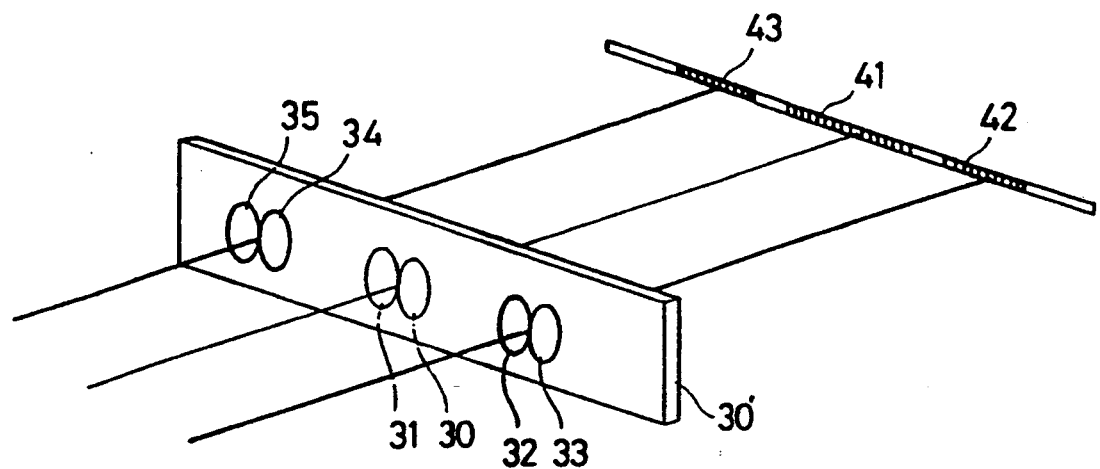
FIG. 7 is a perspective drawing of a separating lens shown in FIG. 5.

As shown in FIG. 6, convex parts of the condensing lens 60 corresponding to the three detecting zones are formed in a one-piece construction. Moreover, as shown in FIG. 7, the separating lens group 30' comprises six lenses 30 to 35 formed in a one-piece construction on a substrate.

By forming the condensing lens 60 and the separating lens group 30' in a one-piece construction, there is no need to adjust the positions of the individual lenses and the efficiency of assembly is improved.

EMBODIMENT 2

Figure 8:
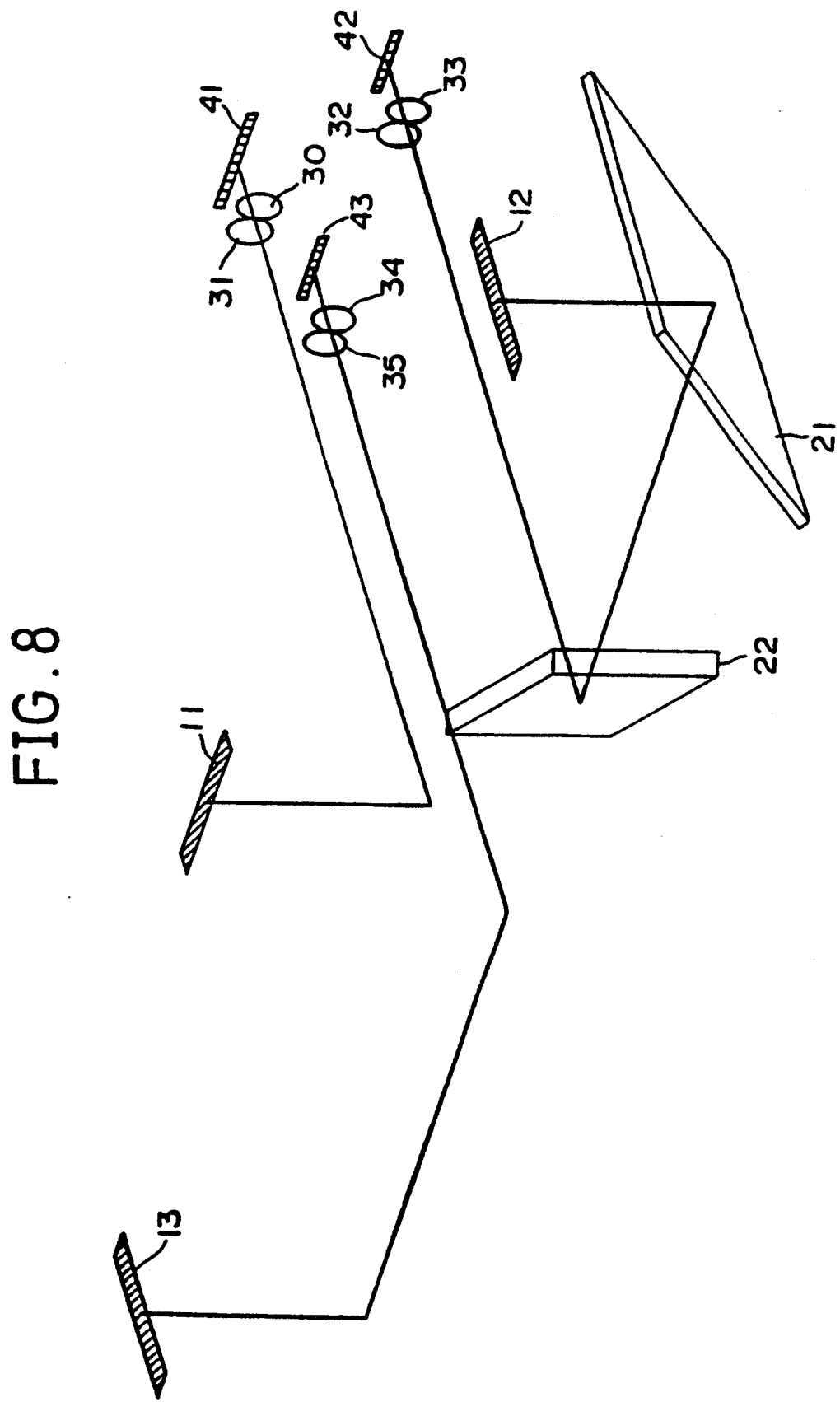
FIG. 8 is a perspective view showing essential parts of a focus detecting apparatus according to a second embodiment of this invention.
Figure 9:
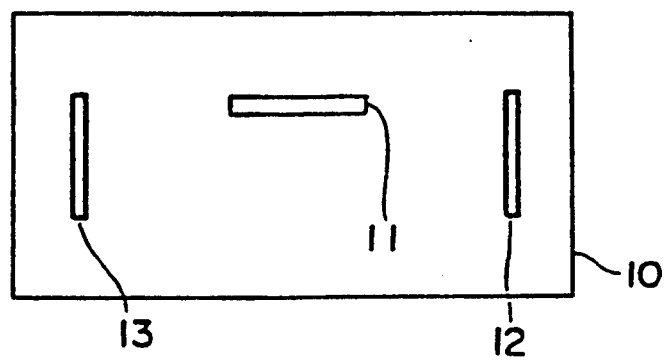
FIG. 9 is a plan view showing an arrangement of focus detecting zones in a focal plane according to the second embodiment of this invention.
Figure 10:
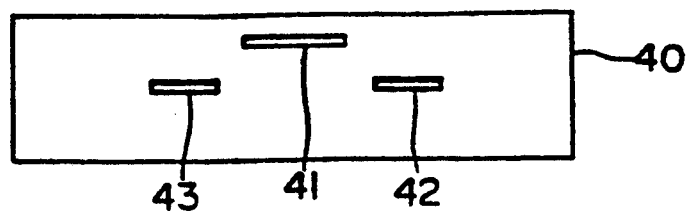
FIG. 10 is a plan view showing an arrangement of line sensors in a reimaging plane according to the second embodiment of this invention.

FIGS. 8-10 show a second embodiment of the focus detecting apparatus of this invention.

According to this embodiment, the focus detecting zones on the visual field mask 10 disposed in the focal plane comprise a central detecting zone 11 situated in a central position not intersecting with the optic axis of the photographic lens, and two peripheral detecting zones 12, 13 on either side of the central zone 11. The longitudinal direction of the central detecting zone 11 corresponds to the longitudinal direction of the focal plane 10, while the peripheral detecting zones 12, 13 are oriented perpendicular to the longitudinal direction of the central zone 11.

The sensor unit 40 of the apparatus in the reimaging plane comprises three line sensors 41, 42, 43 of which the picture elements are oriented in the same direction. Instead of these sensors being arranged in a straight line as they are in Embodiment 1. However, the central sensor is offset with respect to the other two. The remaining construction is-similar to that of Embodiment 1.

As described hereintofore, according to this invention, the line sensors on the sensor unit can be freely arranged independently of the arrangement of the detecting zones in the focal plane. Optimum positional relations may therefore be selected.

EMBODIMENT 3

FIGS. 11 to 15 show a third embodiment of the focus detecting apparatus of this invention.

According to this embodiment, there are provided three focus detecting systems in the same manner as Embodiment 1 and two focus detecting systems for detecting the focus status of the apparatus with respect to objects situated further towards the outside areas than the areas detected by said three focus detecting systems in the longitudinal direction of the focal plane.

Figure 12:
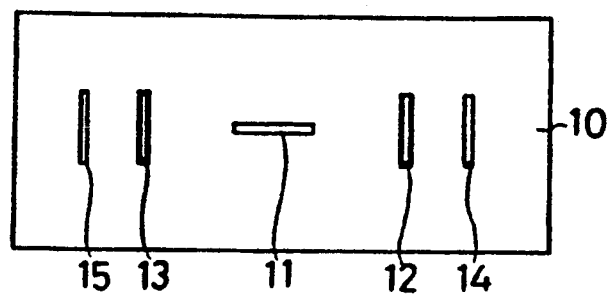
FIG. 12 is a plan view showing the arrangement of focus detecting zones in a focal plane according to the third embodiment of this invention.
Figure 13:
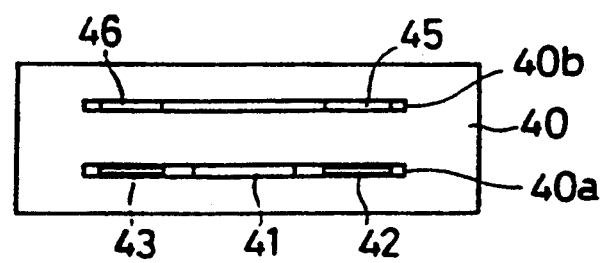
FIG. 13 is a plan view showing the arrangement of line sensors in a reimaging plane according to the third embodiment of this invention.

In this embodiment, as shown in FIG. 12, a central detecting zone 11 and two pairs of peripheral detecting zones 12 to 15 are provided on the visual field mask 10. As shown in FIG. 13, the sensor unit 40 comprises a first line sensor group 40a consisting of line sensors 41, 42, 43 for detecting light beams from the three inner detecting zones 11, 12, 13, and a second line sensor group 40b consisting of line sensors 45, 46 for detecting light beams from the two outer detecting zones 14, 15. These two line sensor groups 40a, 40b are arranged parallel to one another on the sensor unit 40.

The light beam from the inner peripheral detecting zone 12 is reflected by mirrors 21, 22, and separated by separating lenses 32, 33 so as to form image pair on the line sensor 42. The light beam from the outer peripheral detecting zone 14 is also reflected by mirrors 21, 22, and separated by separating lenses 36, 37 so as to form image pair on the line sensor 45.

Mirrors are also provided for the peripheral detecting zones 13, 15 on the reflecting side but are not shown in the drawing.

Figure 11:
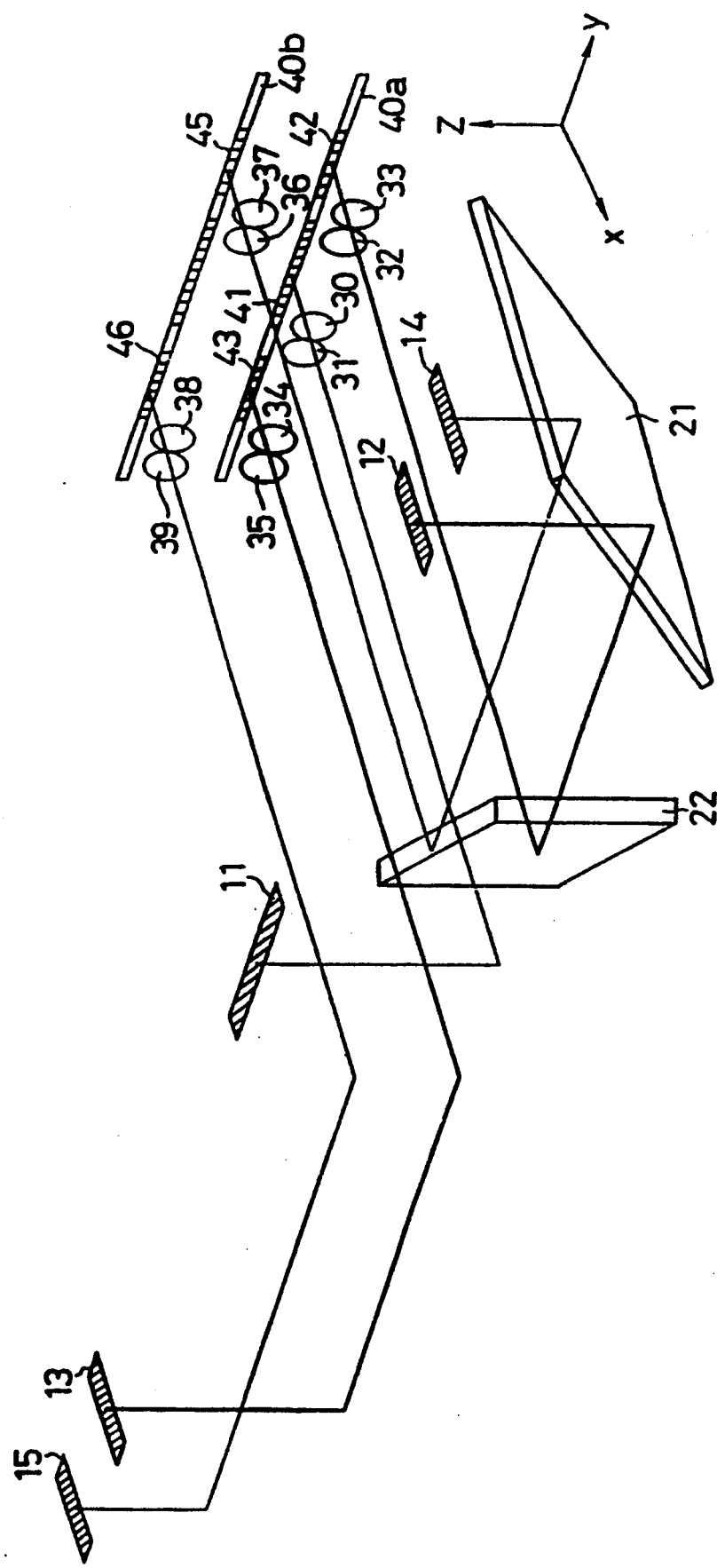
FIG. 11 is a perspective view showing essential parts of a focus detecting apparatus according to a third embodiment of this invention.
Figure 14:
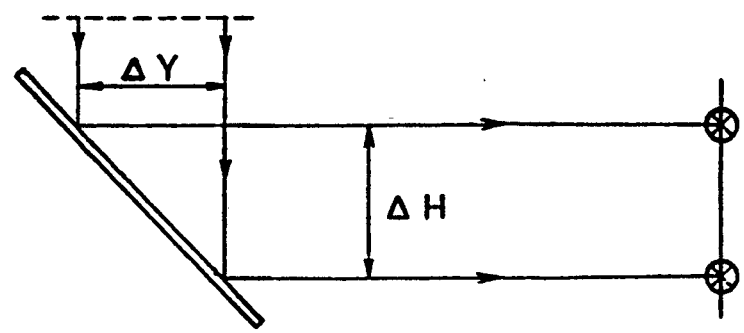
FIG. 14 is a schematic drawing of an optical path in the vicinity of the second mirror in FIG. 11.

The x-y-z axes in FIG. 11 will now be defined. The x-y plane is parallel to the visual field mask 10, and the y-z plane is parallel to the front surface of the sensor unit 40. The projection of the second mirror 21 in the y-z plane is inclined at 45° with respect to the optical paths of the light beams arriving from the detecting zones 12, 14. As shown in FIG. 14, therefore, distance $\Delta Y$ between these two light beams is equal to distance $\Delta H$ between them after they have been reflected by the mirrors 21, 22, and this interval is also the distance between the two line sensor groups 40a, 40b.

Figure 15:
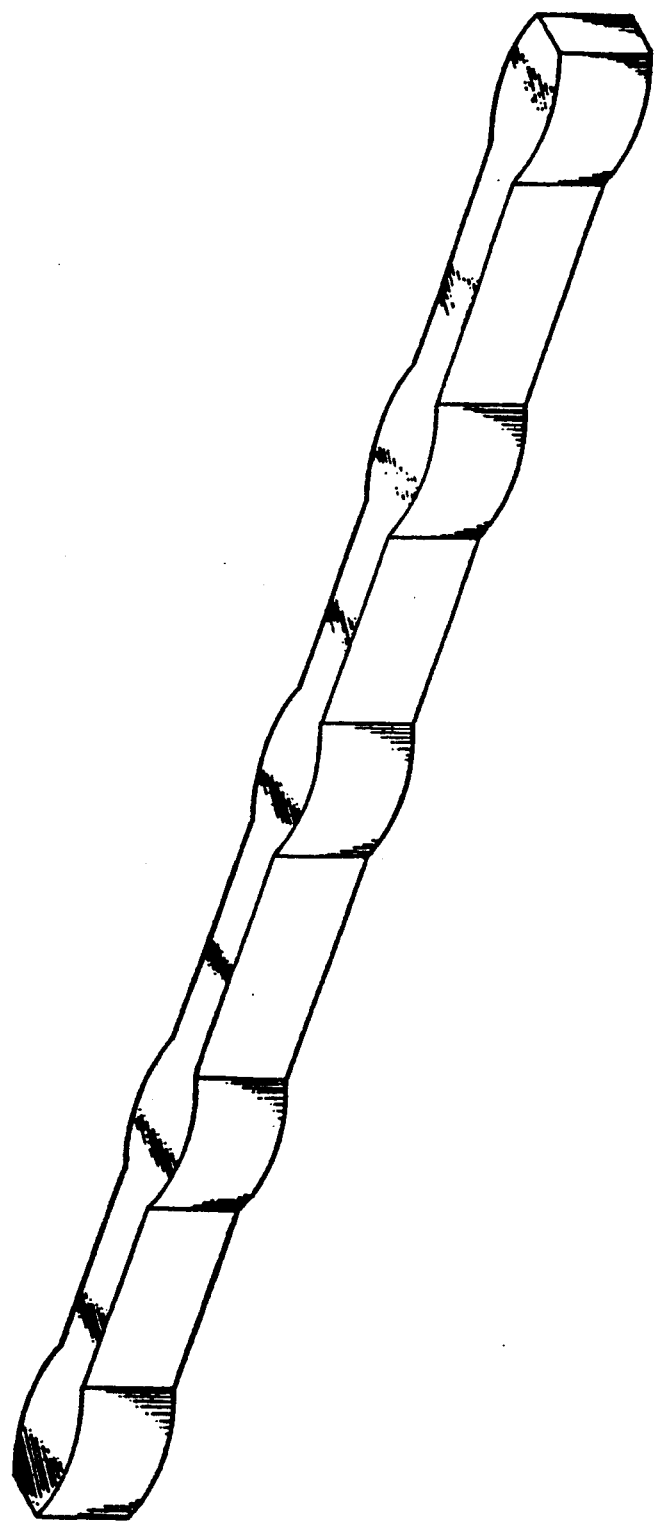
FIG. 15 is a perspective view of the condensing lens in FIG. 11.
Figure 16:
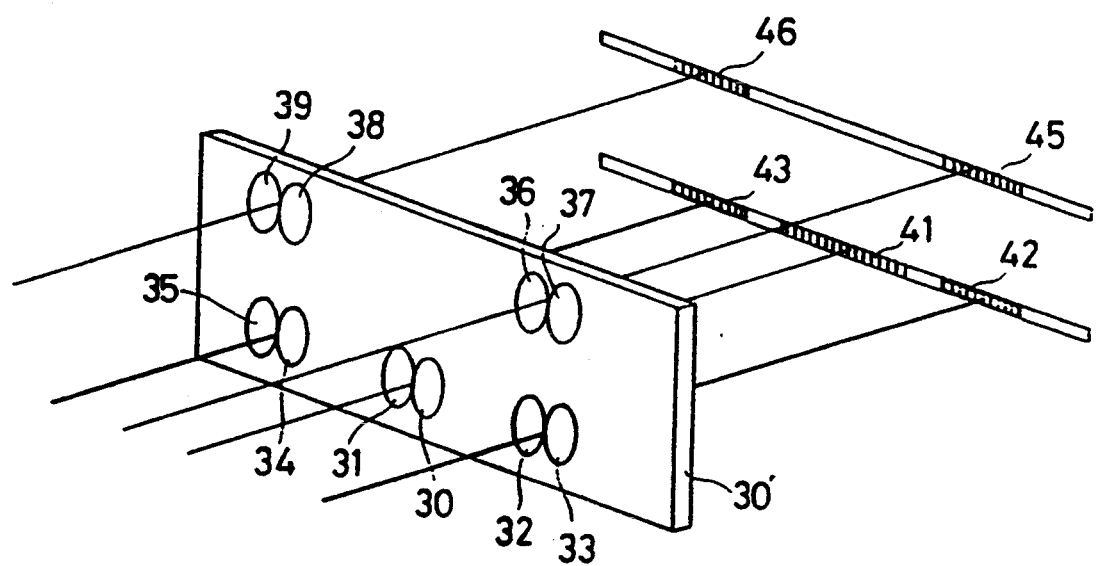
FIG. 16 is a perspective view of the separating lenses in FIG. 11.

In this embodiment, as in Embodiment 1, either or both the condensing lens and separating lens may be formed in a one-piece construction. FIG. 15 shows a condensing lens formed in a one-piece construction, and FIG. 18 shows a separating lens formed in a one-piece construction.

EMBODIMENT 4

Figure 17:
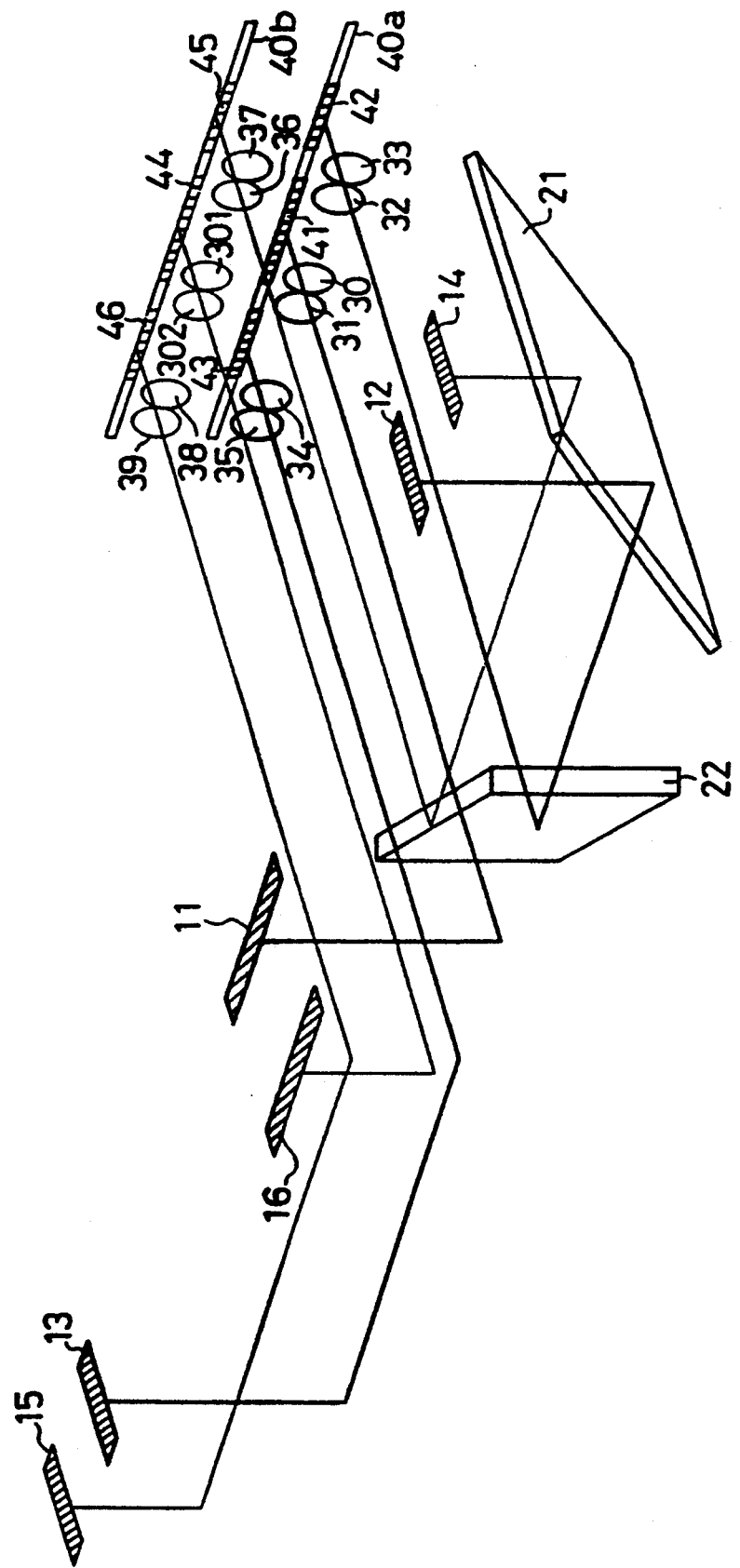
FIG. 17 is a perspective view showing the essential parts of a focus detecting apparatus according to a fourth embodiment of this invention.
Figure 18:
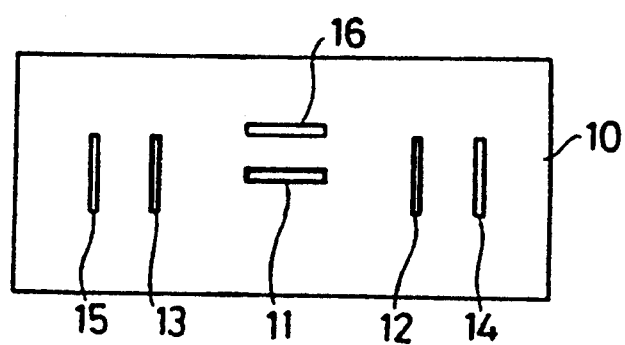
FIG. 18 is a plan view showing the arrangement of focus detecting zones in a focal plane according to the fourth embodiment of this invention.
Figure 19:
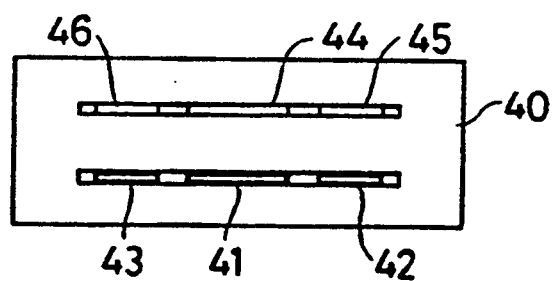
FIG. 19 is a plan view showing the arrangement of line sensors in a reimaging plane according to the fourth embodiment of this invention.
Figure 20:
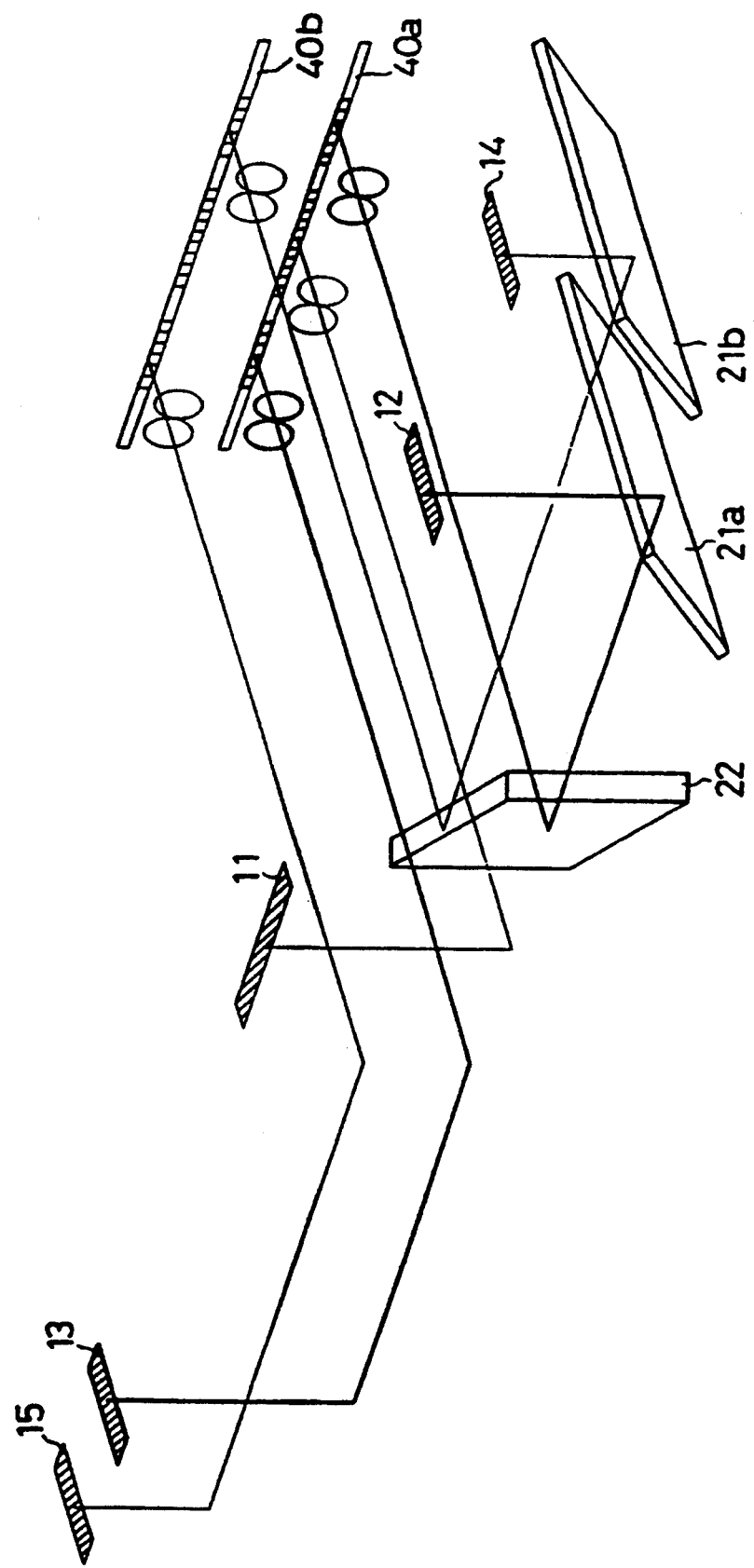
FIG. 20 is a perspective view showing the essential parts of a focus detecting apparatus according to a fifth embodiment of this invention.

FIGS. 17 to 19 show a fourth embodiment of the focus detecting apparatus of this invention. In this embodiment, two detecting zones 11, 16 are provided in the center of the picture, the remaining construction being identical to that of the aforesaid Embodiment 3. The light beam from the detecting zone 16 is reflected by a mirror, not shown, and separated by separating lenses 301, 302 so as to form images on a line sensor 44.

FIG. 18 shows the arrangement of detecting zones on the mask 10, and FIG. 19 shows the arrangement of line sensors in the sensor unit 40.

EMBODIMENT 5

FIGS. 20 to 23 show a fifth embodiment of the focus detecting apparatus of this invention. In this embodiment, light beams from detecting zones 12, 14 on the periphery of the picture are reflected respectively by second mirrors 21a and 21b, and reflected again by a third mirror 22 so as to impinge on corresponding line sensors.

The remaining construction is the same as that of Embodiment 3 shown in FIG. 11. Further, the arrangement of detecting zones on the visual field mask and the arrangement of line sensors in the reimaging plane are substantially the same as those of the embodiment illustrated in FIG. 12 and FIG. 13.

Figure 21:
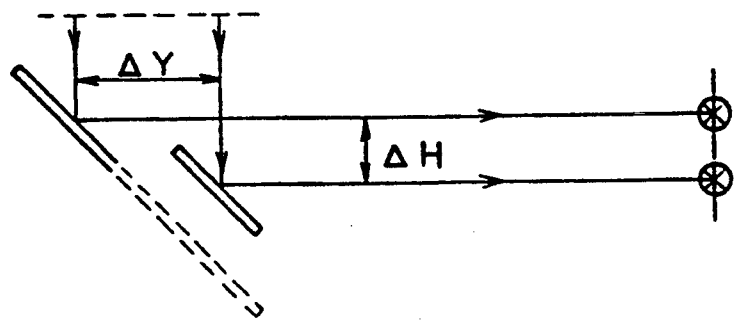
FIG. 21 is a schematic drawing of an optical path in the vicinity of the second mirror in FIG. 20.

In this embodiment, as shown in FIG. 21, the provision of two second mirrors makes it possible to set distance $\Delta H$ between the light beams arriving at the line sensors from the detecting zones 12, 14 smaller than distance $\Delta Y$ between the detecting zones 12, 14 themselves. The distance between the line sensor groups 40a and 40b can therefore be set smaller than that in Embodiment 3, and the sensor unit occupies less space.

Figure 22:
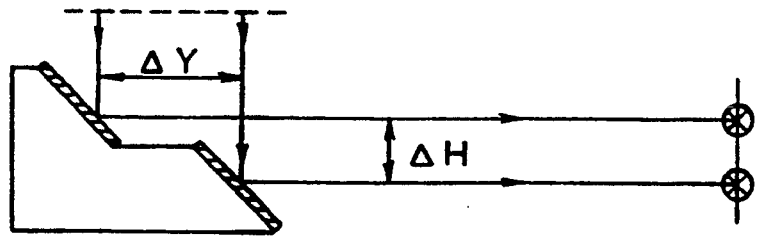
FIG. 22 is a schematic drawing illustrating one example of the second mirror in FIG. 20.
Figure 23:
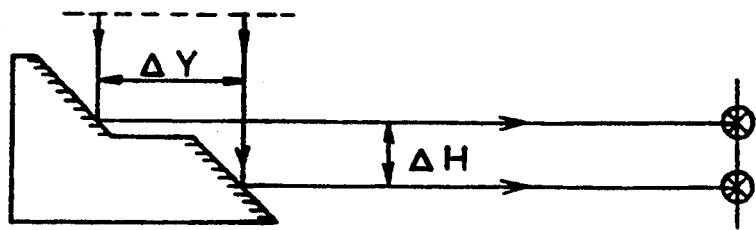
FIG. 23 is a schematic drawing illustrating a further example of the second mirror in FIG. 20.

FIGS. 22 and 23 illustrate specific examples of the mirrors 21a and 21b. In the example shown in FIG. 22, the mirrors are respectively attached to staggered inclined surfaces, while in the example shown in FIG. 23, the mirrors are coated onto staggered inclined surfaces.

EMBODIMENT 8

Figure 24:
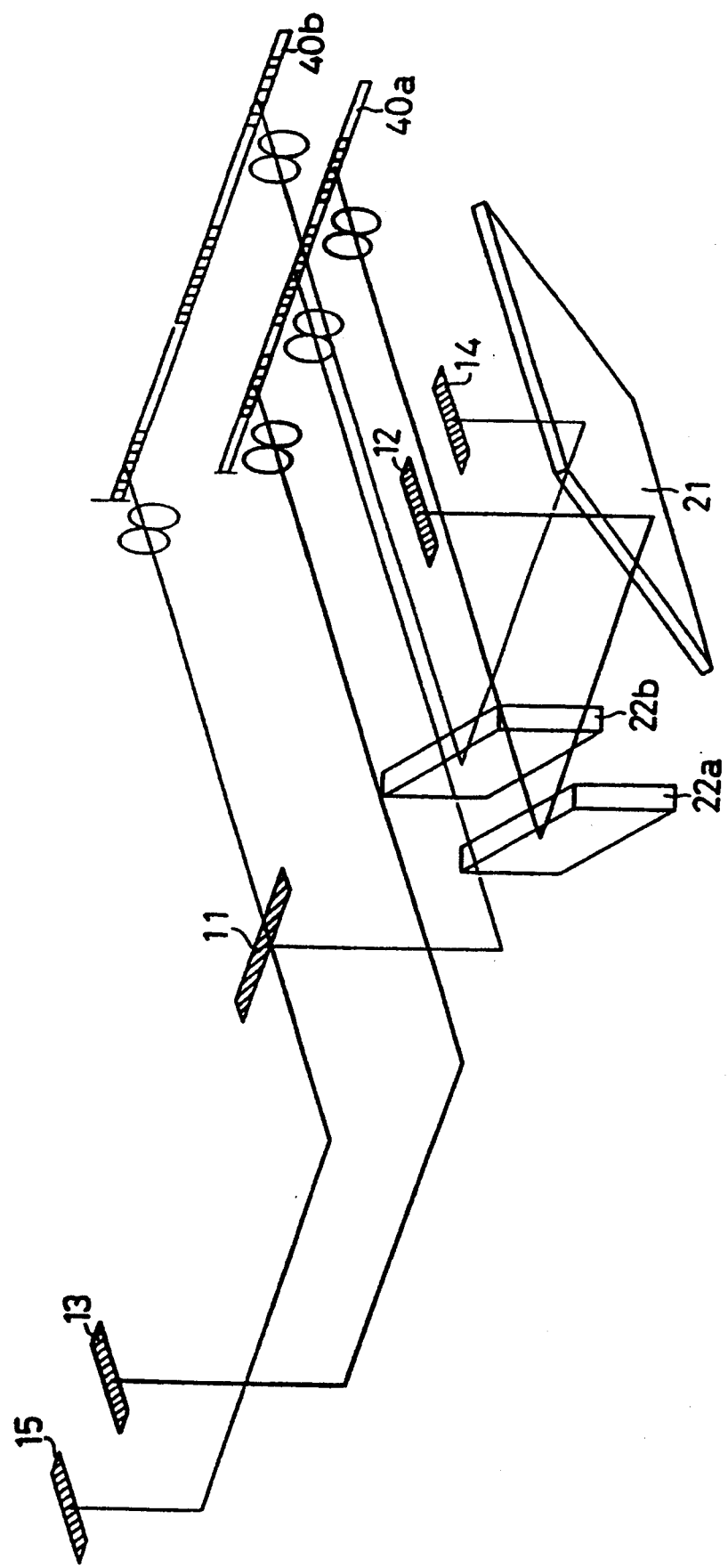
FIG. 24 is a perspective view showing the essential parts of a focus detecting apparatus according to a sixth embodiment of this invention.
Figure 25:
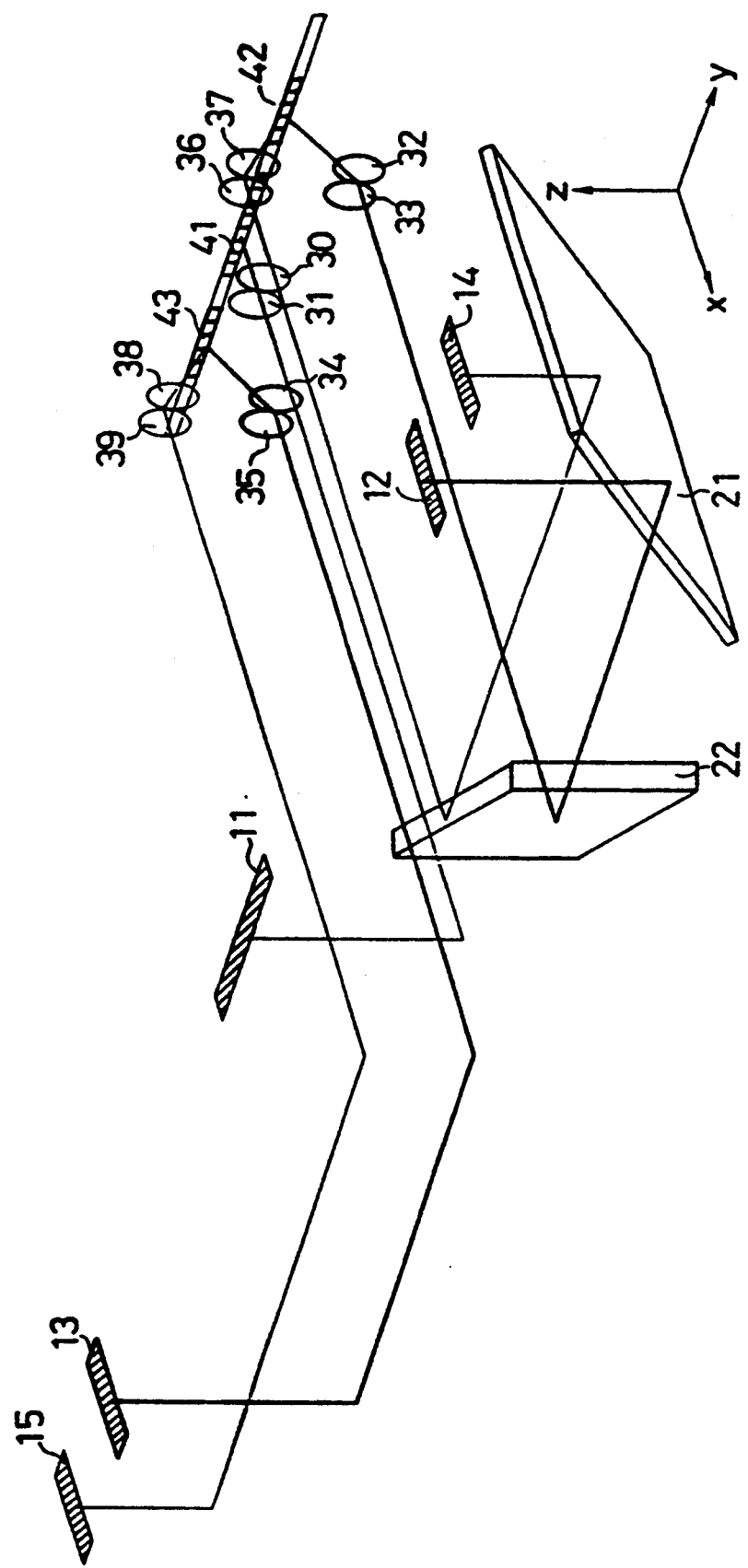
FIG. 25 is a perspective view showing the essential parts of a focus detecting apparatus according to a seventh embodiment of this invention.
Figure 26:
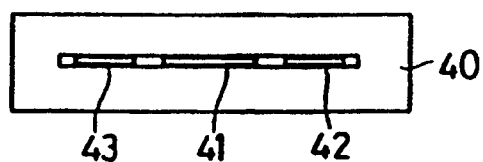
FIG. 26 is a plan view showing the arrangement of line sensors in a reimaging plane according to the seventh embodiment of this invention.

FIG. 24 shows a sixth embodiment of the focus detecting apparatus of this invention. In this embodiment, light beams from detecting zones 12, 14 on the periphery of the picture are both reflected by a second mirror 21, and reflected again respectively by third mirrors 22a and 22b so as to impinge on corresponding line sensors.

The remaining construction is the same as that of Embodiment 3 shown in FIG. 11.

EMBODIMENT 7

FIGS. 25 to 28 show a seventh embodiment of the focus detecting apparatus of this invention. In this embodiment, light beams from five detecting zones 11 to 15 are made to impinge on a single line sensor group 40a.

The light beams from the detecting zones 12, 14 are separated by separating lenses 32, 33, 36 and 37 so as to impinge on a line sensor 42. Similarly, the light beams from the detecting zones 13 and 15 are separated by separating lenses 34, 35, 38 and 39 so as to impinge on a line sensor 43.

To deflect the light beams after they have passed through the separating lenses 32 to 39, a light beam deflecting means is required. Further, as focus detection cannot be performed if light beams from two detecting zones are received simultaneously on the common line sensor, means to obstruct one of the beams is also required.

Figure 27:
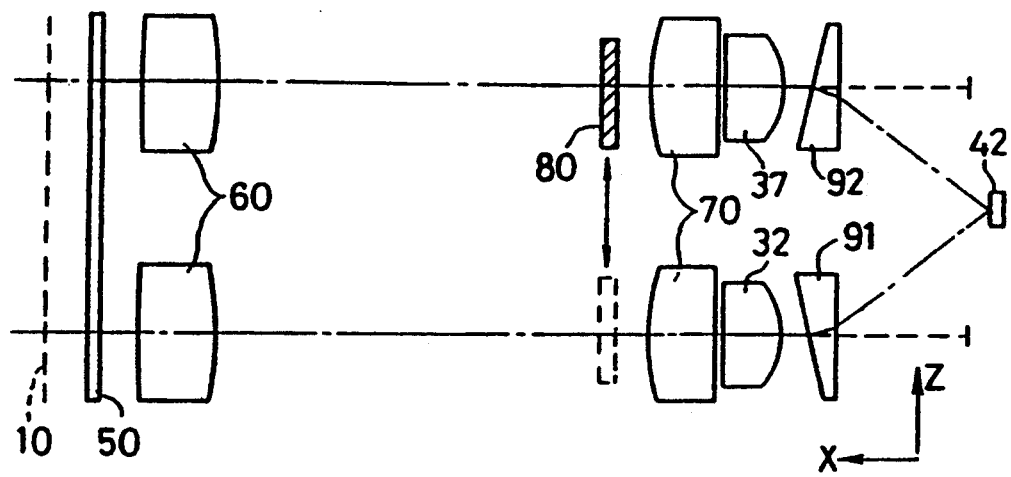
FIG. 27 is a schematic drawing showing one example of the detailed construction of the focus detecting apparatus according to the seventh embodiment of this invention.

FIG. 27 is a schematic drawing in the x-z plane illustrating an example of such an obstructing means and deflecting means. Behind the visual field mask 10, there are provided a cover glass 50 and condensing lenses 60. An opaque screen 80 which slides in the z direction so as to obstruct one of the light paths is provided between the condensing lenses 60 and the auxiliary lenses 70. A light beam which has passed through one of the auxiliary lenses 70 and either of the separating lenses 82, 87 then passes through either of prisms 91, 92 which act as deflecting means so as to impinge on the line sensor 42.

Figure 28:
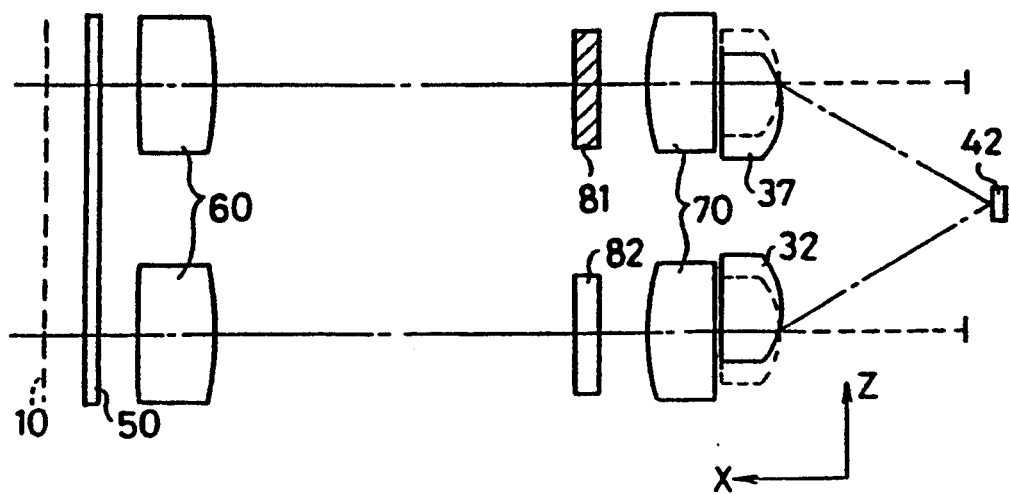
FIG. 28 is a schematic drawing showing a further example of the detailed construction of the focus detecting apparatus according to the seventh embodiment of this invention.

FIG. 28 shows another example of an obstructing means and deflecting means. In this example, liquid crystal shutters 81, 82 are installed in both light paths between the condensing lenses 60 and auxiliary lenses 70. These liquid crystal shutters are rendered either transparent or opaque by switching an applied voltage ON or OFF. In this example, one of the liquid crystal shutters is rendered transparent and the other is rendered opaque so as to select a light beam which impinges on the line sensor 42.

In the example of FIG. 28, the selecting lenses 32, 27 are decentered with respect to the optic axes of the light beams so as to cause the beams which have passed through the lenses to impinge on the line sensor 42.

EMBODIMENT 8

Figure 29:
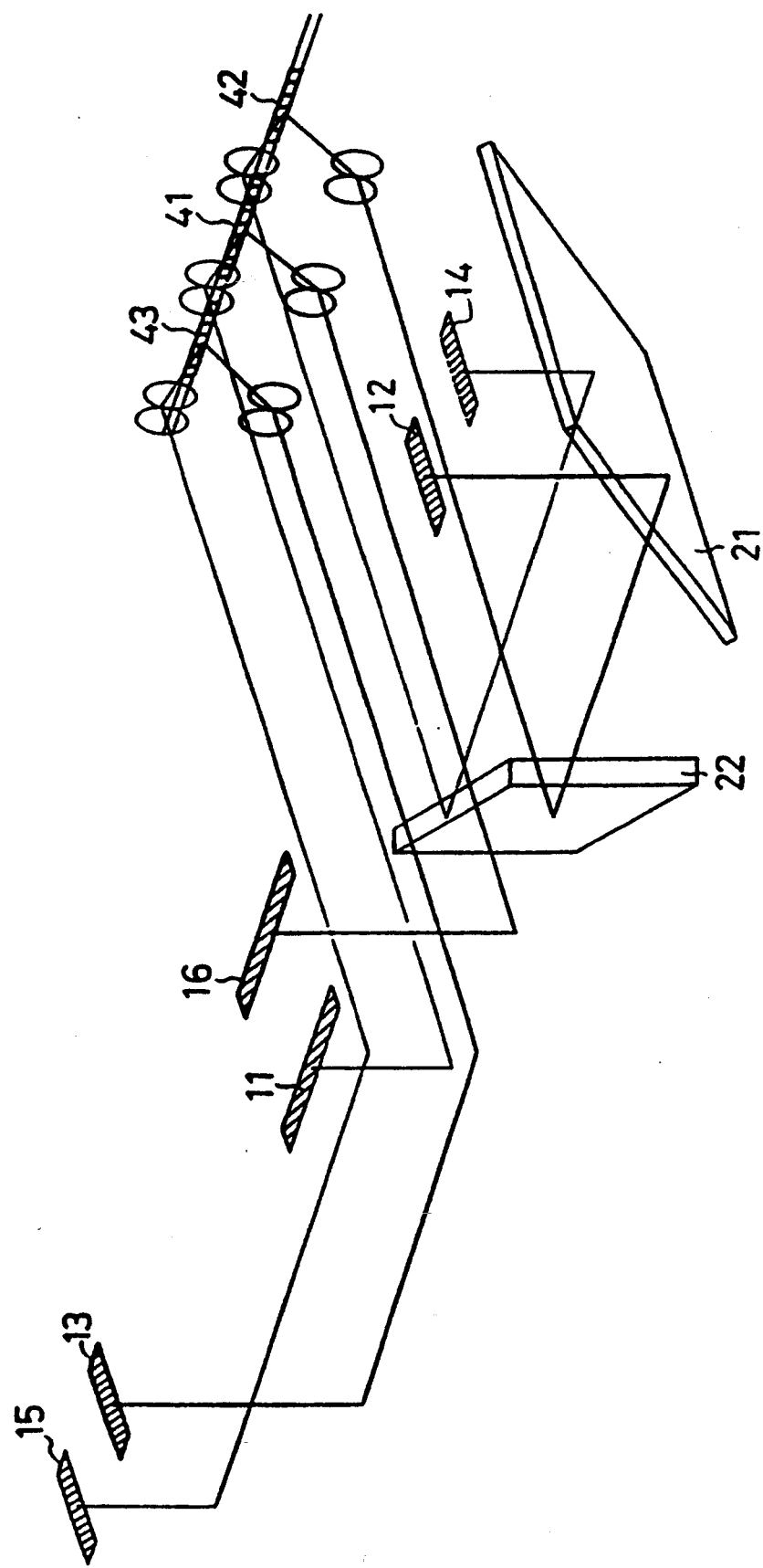
FIG. 29 is a perspective view showing the essential parts of a focus detecting apparatus according to an eighth embodiment of this invention.

FIG. 29 shows an eighth embodiment of the focus detecting apparatus of this invention. In this embodiment, six focus detecting zones 11 to 16 are provided on a visual field mask as in the example illustrated in FIG. 18. Light beams from detecting zones 11, 16 impinge on a line sensor 41. Light beams from detecting zones 12, 14 impinge on a line sensor 42, and light beams from detecting zones 13, 15 impinge on a line sensor 48. The remaining construction is the same as that of the preceding Embodiment 7.

EMBODIMENT 9

Figure 30:
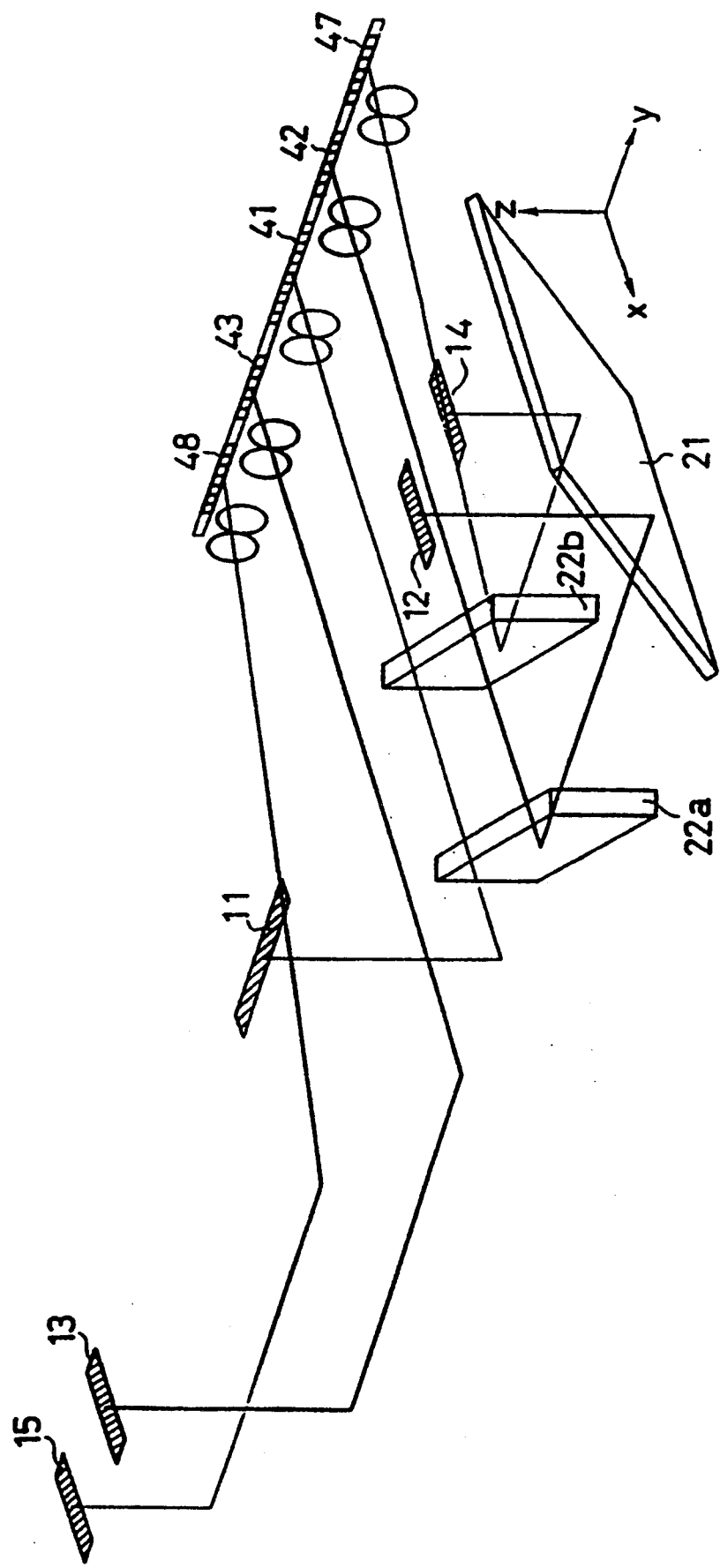
FIG. 30 is a perspective view showing the essential parts of a focus detecting apparatus according to a ninth embodiment of this invention.
Figure 31:
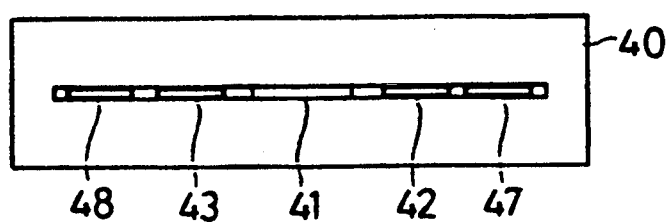
FIG. 31 is a plan view showing an arrangement of line sensors in a reimaging plane according to the ninth embodiment of this invention.

FIG. 30 shows a ninth embodiment of the focus detecting apparatus of this invention. In this embodiment, light beams from five detecting zones 11 to 15 are all made to impinge on line sensors 41 to 48 arranged in a straight line. FIG. 31 shows the arrangement of sensors in this embodiment.

The light beam incident from the detecting zone 12 is reflected by a second mirror 21 and a third mirror 22a so as to impinge on the line sensor 42. The light beam from the detecting zone 14 is reflected by the second mirror 21 and a third mirror 22b so as to impinge on the line sensor 47.

The third mirrors 22a and 22b are set at different angles in the x-y plane and x-z plane.

According to this embodiment, the light beams from all five detecting zones can be detected simultaneously by One line sensor.

What is claimed is:

1. A focus detecting apparatus of a camera, comprising:
    a generally rectangular detecting zone defined by oppositely disposed long and short sides, said long sides of said detecting zone being directed along a first direction with respect to a view area of the camera, in a focal plane of a photographing lens of the camera;
    means for separating an image in said detecting zone into a pair of images;
    a sensor unit, said sensor unit comprising a line sensor extending along a second direction, the second direction differing from the first direction with respect to the viewing area of the camera; and
    means for changing a direction of images formed in said detecting zone so as to conform with said line sensor.

2. The focus detecting apparatus of a camera according to claim 1, said direction changing means comprising means for orienting said images in accordance with an orientation of said line sensor.

3. The focus detecting apparatus of a camera according to claim 1, said direction changing means comprising a first mirror reflecting light rays from said detecting zone and a second mirror reflecting light rays reflected by said first mirror toward said line sensor, said first and second mirrors being arranged so that an optical axis from said second mirror to said line sensor intersects a plane that includes an optical axis extending from said detecting zone to said second mirror.

4. The focus detecting apparatus of a camera according to claim 3, wherein the optical axis from said second mirror to said line sensor intersects the plane that includes the optical axis from said detecting zone to said second mirror at right angles.

5. The focus detecting apparatus of a camera, comprising:
    a generally rectangular detecting zone arranged in a focal plane of a photographing lens of the camera;
    means for separating an image in said detecting zone into a pair of images;
    a sensor unit comprising a line sensor;
    a first mirror for deflecting light rays from said deflecting zone; and
    a second mirror for deflecting light rays deflected by said first mirror towards said line sensor;
    wherein said first and second mirrors are arranged so that an optical axis from said second mirror to said sensor intersects a plane that includes an optical axis from said detecting zone to said second mirror.

6. The focus detecting apparatus of a camera according to claim 5, wherein said detecting zone and said linesensor are aligned on skew lines.

7. A focus detecting apparatus of a camera, comprising:
    a generally rectangular detecting zone arranged in a focal plane of a photographing lens of the camera;
    means for separating and image in said detecting zone into a pair of images;
    a sensor unit comprising a line sensor; and
    means for changing a direction of orientation of images formed in said detecting zone so as to conform with said line sensor, wherein said detecting zone and said line sensor are aligned on skew lines.

8. The focus detecting apparatus of a camera according to claim 7, said direction changing means comprising means for orienting said images in accordance with an orientation of said line sensor.

9. A focus detecting apparatus of a camera, comprising:
    a central, generally rectangular detecting zone, said detecting zone being defined by oppositely disposed long and short sides, said long sides extending along a first direction in a focal plane of a photographing lens of the camera;
    a peripheral generally rectangular detecting zone defined by oppositely disposed long and short sides, said long sides extending along a second direction substantially perpendicular to said first direction in said focal plane;
    a sensor unit having a central line sensor portion and a peripheral line sensor portion, said central and peripheral line sensor portions being arranged along a straight line;
    separating lens pairs, for separating each image in said generally rectangular detecting zones into a pair of images on each of said line sensor portions; and means for changing a direction of images said detecting zones so as to conform with said line sensor portions.

10. The focus detecting apparatus of a camera according to claim 9, said direction changing means comprising means for orienting said images in accordance with an orientation of said line sensor.

11. The focus detecting apparatus of a camera according to claim 9, said changing means comprising a first mirror for reflecting a light rays from said central detecting zone towards said central line sensor portion, a second mirror for deflecting light rays from said peripheral detecting zone to said first mirror side, and a third mirror for reflecting light rays deflected by said second mirror towards said peripheral line sensor portion.

12. A focus detecting apparatus of a camera, comprising:

a central, generally rectangular detecting zone defined by oppositely disposed pairs of long and short sides, said long sides extending along a first direction in a focal plane of a photographing lens of the camera;

two peripheral generally rectangular detecting zones each defined by oppositely disposed long and short sides, said long sides extending along a second direction substantially perpendicular to said first direction in said focal plane;

a sensor unit having a central line sensor portion and two peripheral line sensor portions, said central and said peripheral line sensor portions being arranged along a straight line;

three separating lens pairs for separating each image in said generally rectangular detecting zones into a pair of images on each said line sensor portion;

a first mirror for deflecting light rays from said central detecting zone toward said central line sensor portion;

two second mirrors for deflecting light rays from said peripheral detecting zones to said first mirror side; and two third mirrors for deflecting light rays, deflected by said second mirrors, towards said peripheral line sensor portions.

* * * * *

UNITED STATES PATENT AND TRADEMARK OFFICE
CERTIFICATE OF CORRECTION

PATENT NO. : 5,397,887
DATED : March 14, 1995
INVENTOR(S) : Takayuki SENSUI

It is certified that error appears in the above-indentified patent and that said Letters Patent is hereby corrected as shown below:

On the cover page, item [56], line 16 under Other Publications. change "Japanese of Publication" to ---Japanese Publication---.
On the second page of the cover page, item [56], line 15 under U.S. Patent Documents, change "4,716,431 12/1997" to ---4,716,431 12/1990----.
At column 8, line 34 (claim 6, line 3), change "linesensor" to ---line sensor---.
At column 8, line 39 (claim 7, line 5), change "and" to ---an---.
At column 9, line 11 (claim 11, line 3), change "a light" to ---light---.

Signed and Sealed this

Nineteenth Day of September, 1995

Attest:

BRUCE LEHMAN

Attesting Officer

Commissioner of Patents and Trademarks